United States Patent [19]

White

[11] 4,102,261
[45] Jul. 25, 1978

[54] ADJUSTABLE MOUNTING FOR TYING NEEDLES

[75] Inventor: Allen A. White, Peabody, Kans.

[73] Assignee: Hesston Corporation, Hesston, Kans.

[21] Appl. No.: 767,986

[22] Filed: Feb. 11, 1977

[51] Int. Cl.² .............................................. B65B 13/04
[52] U.S. Cl. ......................................... 100/24; 403/4; 403/234
[58] Field of Search ............. 100/17, 18, 19 A, 19 R, 100/20, 21, 22, 23, 24; 403/4, 234, 278, 279

[56] References Cited

U.S. PATENT DOCUMENTS 2,822,749  2/1958  Nolt .................................. 100/24 X
3,036,514  5/1962  McDuffie .......................... 100/19 R Primary Examiner—Billy J. Wilhite
Attorney, Agent, or Firm—Schmidt, Johnson, Hovey & Williams

[57] ABSTRACT

The base end of the needle is draw-bolted tightly against a transverse supporting shaft for movement of the needle with the shaft during swinging of the latter, but enlarged openings through which the draw bolt extends permit the needle to be adjustably shifted about the periphery of the shaft without first loosening the draw bolt when setscrews on opposite sides of the latter are turned to effect such adjustment.

15 Claims, 6 Drawing Figures

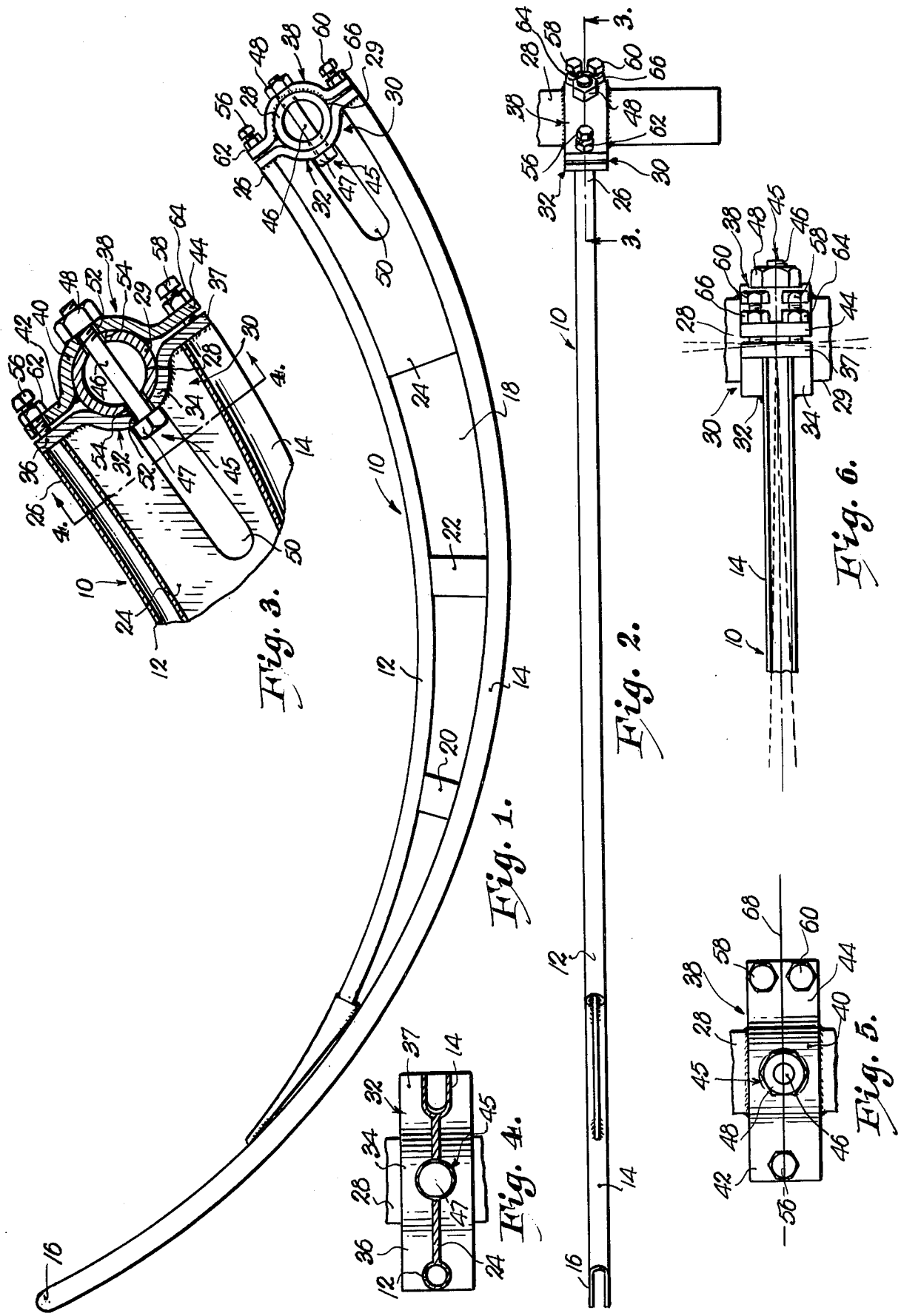

ADJUSTABLE MOUNTING FOR TYING NEEDLES

This invention relates to a mounting arrangement for needles that are used during the twine or wire tying of crop bales. Typically, such cantilevered needles are individually mounted on a common transverse shaft by a clamp having bolts or screws that draw the needle tightly against the shaft in a selected position.

However, such clamps are not conducive to the fine, accurate adjustment of the needle that is so important to a proper twine-knotting or wire-twisting operation, the relationship of the needle tip to the knotter or twister as the needle presents the binding material to such mechanism being quite critical. Under present conditions, in order to adjust the needle position, the clamp must be loosened substantially in order to permit the needle to be manually rotated a selected distance about the shaft, whereupon the clamp can then be retightened. Once the clamp is loosened, of course, the needle may accidentally slip out of position entirely which is highly aggravating in that the operator must then re-establish the original needle position before knowing how much adjustment to make.

Moreover, while it is thus desirable not to loosen the needle anymore than absolutely necessary, by leaving the clamp too tight, the operator might encounter uneven resistance to his repositioning efforts, causing jerky, abrupt shifting and the resulting inaccurate adjustment.

Accordingly, one important object of the present invention is to provide a way of adjusting the position of the needles about their support without first requiring that the needles be loosened from the support.

Another important object of this invention is to provide for the slow, steady and increment-by-increment adjustment of the needle position about the support so as to permit truly fine and accurate adjustment.

An additional important object of the present invention is to take advantage of the fact that by virtue of the relatively great length of such needles compared to the size of the mounting support therefor, accommodations need be made only for slight movement of the supported end of the needle in order to accomplish substantial adjustment of the tip of the needle.

A further important object is to provide for accurate, easy adjustment, but without sacrificing to any degree the ability of the needles to remain firmly in place in a selected position during repeated tying operations. In the drawing:

FIG. 1 is an elevational view of a needle mounted on a support shaft therefor in a manner according to the principles of the present invention;

FIG. 2 is a top plan view thereof;

FIG. 3 is an enlarged, fragmentary cross-sectional view thereof taken along line 3—3 of FIG. 2;

FIG. 4 is a fragmentary cross-sectional view thereof taken along line 4—4 of FIG. 3;

FIG. 5 is a rear elevational view thereof in a direction opposite to that of FIG. 4; and FIG. 6 is a bottom elevational view thereof illustrating in phantom lines the way in which the needle can be cocked slightly from side to side.

The needle 10 that has been selected for purposes of illustration is generally arcuate in overall configuration and is of open framework construction, having a pair of structural elements 12 and 14 that converge arcuately as the tip 16 is approached. The crescent-shaped space 18 between the elements 12 and 14 is bridged periodically by gussets 20, 22 and 24, the latter terminating at the supported end 26 of the needle 10.

The needle 10 is mounted in cantilever fashion on a transverse support shaft or pipe 28 which has an arcuate periphery 29 by virtue of its circular cross-sectional configuration. Structure broadly designated by the numeral 30 fastens the needle 10 against the shaft 28 and holds the same against other than intentional movement out of a selected, adjusted position. A generally semicircular, flanged plate member 32 forms part of the structure 30 and extends transversely across the end 26 in rigid attachment thereto. The central bowed section 34 of the plate 32 bears against and complementally receives the periphery 29, while abutments 36 and 37 extend laterally in opposite directions from the section 34, generally radially outwardly with respect to the shaft 28.

A second member 38 having a configuration identical to the member 32 is disposed on the opposite side of the shaft 28 and forms another part of the structure 30, the member 38 having its bowed section 40 rigidly affixed to the periphery 29 such as by welding. The lateral extensions 42 and 44 projecting outwardly from bowed section 40 in opposite directions are disposed in overlying registration with the corresponding abutments 36 and 37, respectively.

Further defining the structure 30 is a draw bolt fastener 45 having a pair of shoulders defined at the opposite ends of its shank 46 by head 47 and nut 48, the latter, of course, being threadably received on the shank 46 such as to make the defined shoulders relatively shiftable toward and away from one another. The gusset 24 is slotted at 50 to provide room for initially inserting the shank 46 through enlarged and generally aligned openings 52 is the members 32, 38 and apertures 54 in the shaft 28. When the nut 48 is threaded onto the shank 46, the needle 10 is drawn tightly against the shaft 28 as the bolt 45 draws the section 34 against the periphery 29.

Although the needle 10 is clamped tightly against the shaft 28, it may be adjustably rotated about the latter by virtue of at least two setscrews on opposite sides of the draw bolt 45, in this instance three of such setscrews 56, 58 and 60 being illustrated. Setscrew 56 is threadably received by the extension 42 and extends through the latter to engage the abutment 36. Correspondingly, the setscrews 58 and 60 are threadably received by the extension 44 and extend through the latter into engagement with the abutment 37. Thus, by backing off the setscrew 56 and turning down the setscrews 58, 60 (or vice versa), the member 32 can be pushed about the periphery 29 to the extent permitted by the oversized openings 52 and apertures 54, thereby also effecting displacement of the tip 16. Locknuts 62, 64 and 66 on the setscrews 56, 58 and 60, respectively, may be used to fix the setscrews 56, 58 and 60 in selected positions of turnout or turndown.

The setscrews 56, 58 and 60 are positioned in a triangular orientation as illustrated well in FIG. 5 with the setscrew 56 being located on an imaginary centerline 68 that bisects the member 37 and intersects the longitudinal axis of the bolt 45 while the setscrews 58 and 60 are located on opposite sides of the centerline 68. Thus, a stable arrangement is presented which avoids unintentional canting of the member 32 with respect to the other member 38. On the other hand, should it be necessary or desirable to cock the needle 10 laterally a slight amount, such can be accommodated by slight over or under adjustment of one of the setscrews 58, 60 with respect to the other. This is illustrated, for example, by the phantom lines in FIG. 6.

From the foregoing description, use of the mounting arrangement of the present invention should be readily apparent. As explained, once the draw bolt 45 has tightly fastened the needle 10 against the support shaft 28, the needle 10 is more or less permanently attached and bolt 42 need not be manipulated again. While such attachment is firm and intentionally quite stable, nonetheless the complemental relationship between the section 34 and the periphery 29 is such as to permit the member 32 (and hence the needle 10) to slide about the periphery 29 in response to turning the setscrews 56, 58 and 60 in the appropriate directions after the locknuts 62, 64 and 66 have been loosened. Because of the oversized nature of the openings 52 and apertures 54 with respect to the shank 46 of the bolt 45, the latter does not prevent such sliding movement, at least within the limits to which the tip 16 need normally be adjusted. Consequently, the needle 10 can remain firmly attached to the shaft 28 at all times throughout the adjustment, precluding any accidental slippage as aforementioned, and greatly facilitating the overall adjustment procedure.

Note that very fine adjustments can be made, depending in part upon the pitch of the threads of the setscrews 56, 58 and 60. By simply turning the setscrews 56, 58 and 60 an appropriate amount with the proper tool, the exact amount of adjustment can be readily obtained. Note further that only slight movement of the setscrews 56, 58 and 60 is required in order to obtain substantial displacement of the tip 16 in view of the long lever arm presented by the needle 10. Hence, a substantial amount of displacement of the tip 16 can be obtained with but slight turning of the setscrews 56, 58 and 60.

Having thus described the invention, what is claimed as new and desired to be secured by Letters Patent is:

1. A cantilevered mounting for an elongated tying needle comprising:
   a transverse support having an arcuate periphery:
   structure at one end of the needle fastening the same tightly against said support with a predetermined amount of force; and
   means for adjustably rotating the needle about said periphery while said predetermined amount of force remains applied whereby to vary the circumferential position of the opposite end of the needle with respect to the support.

2. A cantilevered mounting as claimed in claim 1, wherein said structure includes a member complementally bearing against said periphery and adjustable about the latter with the needle.

3. A cantilevered mounting as claimed in claim 2, wherein said structure further includes an elongated fastener drawing the member against said periphery, said member having means for clearing the fastener during movement of the member with the needle relative to the fastener.

4. A cantilevered mounting as claimed in claim 3, wherein said clearing means includes an enlarged opening through which said fastener extends, said fastener having a shoulder abutting the member remote from the support that limits axial movement of the fastener through said opening.

5. A cantilevered mounting as claimed in claim 1, wherein said support has an enlarged aperture therethrough receiving said fastener for limited transverse shifting of the latter during said adjustment.

6. A cantilevered mounting as claimed in claim 1, wherein said structure includes a pair of clamping members embracing said support, at least one of which is adjustable with the needle.

7. A cantilevered mounting as claimed in claim 6, wherein the other of said members is fixed to the support against adjustment with said needle.

8. A cantilevered mounting as claimed in claim 6, wherein said structure further includes an elongated fastener interconnecting said members and drawing the needle against the support, at least said one member having an enlarged opening receiving and clearing the fastener during said adjustment.

9. A cantilevered mounting as claimed in claim 1, wherein said structure includes a member complementally bearing against said periphery and adjustable about the latter with the needle, said rotating means including a pair of devices engageable with said member and operable to rotate the latter in either of two opposite directions about said periphery.

10. A cantilevered mounting as claimed in claim 9, wherein said member includes a central peripheryengaging section and a pair of lateral abutments extending outwardly from opposite sides of said section, each of said devices being disposed for said operating engagement with a corresponding one of said abutments.

11. A cantilevered mounting as claimed in claim 10, wherein each of said devices includes a setscrew disposed to transmit force between said support and the corresponding abutment.

12. A cantilevered mounting as claimed in claim 11, wherein said support has a pair of lateral extensions rigid thereto and disposed in registration with respective ones of said abutments, said setscrews operating between said abutments and said extensions.

13. A cantilevered mounting as claimed in claim 12, wherein said structure further includes a second member in spaced opposition to the first-mentioned member, said members cooperating to embrace said support, said second member being rigid to the support and including said extensions as integral parts thereof.

14. A cantilevered mounting as claimed in claim 10, wherein said structure further includes an elongated fastener drawing said section against said periphery, said section having an enlarged opening that receives said fastener and clears the latter during said rotation of the member.

15. A cantilevered mounting as claimed in claim 14, wherein said fastener includes a shank and a pair of shoulders at opposite ends of the shank that are shiftable relatively toward and away from one another to clamp the member against the support, said support having an enlarged aperture therethrough for the shank to clear the latter during said adjustment.

* * * * *